(12) United States Patent
Takei et al.

(10) Patent No.: US 6,968,129 B2
(45) Date of Patent: Nov. 22, 2005

(54) LENS DRIVING DEVICE AND IMAGING DEVICE

(75) Inventors: Tomoya Takei, Tokyo (JP); Shinichi Orimo, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/817,850

(22) Filed: Apr. 6, 2004

(65) Prior Publication Data

US 2004/0234258 A1 Nov. 25, 2004

(30) Foreign Application Priority Data

Apr. 15, 2003 (JP) ............................ P2003-109777

(51) Int. Cl.[7] ............................ G03B 3/10; G02B 7/02; H02K 41/035
(52) U.S. Cl. ........................ 396/85; 396/133; 359/824; 310/12
(58) Field of Search .......................... 396/72–88, 133, 396/463, 467, 468; 348/240.99, 240.1, 240.3, 348/345, 357; 359/824; 310/12–14

(56) References Cited

U.S. PATENT DOCUMENTS

| 4,540,905 | A | * | 9/1985 | Morino et al. ................ 310/12 |
| 5,073,882 | A | * | 12/1991 | Sasaki ..................... 369/44.15 |
| 5,541,777 | A | * | 7/1996 | Sakamoto et al. .......... 359/824 |
| 6,043,572 | A | * | 3/2000 | Nagai et al. ................. 310/12 |
| 2001/0026528 | A1 | * | 10/2001 | Suzuki et al. ............... 369/244 |

FOREIGN PATENT DOCUMENTS

| JP | 07-239437 | 9/1995 |
| JP | 2002-169073 | 6/2002 |

* cited by examiner

Primary Examiner—W. B. Perkey
(74) Attorney, Agent, or Firm—Rader, Fishman & Grauer PLLC; Ronald P. Kananen

(57) ABSTRACT

To enable the thrust of a linear actuator comprised of a driving magnet and a drive coil to act in a fixed and stable manner, the present invention is a lens driving device that comprises a driven body supporting an optical lens capable of freely moving along an optical axis direction, a drive coil fitted to the driven body, and a magnet having a surface set so as to have a prescribed gap with the moving drive coil, wherein a gap between the surface of the magnet and the drive coil is set in such a manner as to be broader at a central part of the range of movement of the drive coil than at an end part.

10 Claims, 8 Drawing Sheets

CHANGE IN THRUST IN LENGTH DIRECTION OF MAGNET

PROPORTION OF ASPECT RATIO AND DECREASE IN THRUST

LENS DRIVING DEVICE AND IMAGING DEVICE

CROSS REFERENCE TO RELATED APPLICATION

This application claims priority from Japanese Priority Document No. 2003-109777, filed on Apr. 15, 2003 with the Japanese Patent Office, which document is hereby incorporated by reference.

BACKGROUND OF THE INVENTION

1. Field of the Invention

The present invention relates to a lens driving device for moving an optical lens in the direction of an optical axis and an imaging device using this lens driving device.

2. Description of Related Art

Typically, imaging devices such as video cameras equipped with an autofocus function and electric zoom function are provided with lens driving devices for moving a moving lens for focusing and a moving lens for zooming along the direction of an optical axis. Electromagnetically driven actuators having, for example, a coil and a magnet, such as electromagnetically driven devices, are commonly used as this type of lens driving device.

Conventionally, drive means employing a stepping motor or DC motor where rotational movement of the motor is converted to rectilinear movement using gears etc. so as to cause a zoom lens or focus lens to move along an optical axis direction are widely adopted as actuators used in these lens driving devices. However, rectilinear driving means using linear actuators that combine flat plate magnets and drive coils have also been adopted to accompany advancement of performance required in high-speed drive and high-precision drive.

As disclosed in patent document 1 and patent document 2 mentioned below, such an actuator is equipped with a magnet being flat and having an equal width in the drive direction, a yoke being flat and having an equal width in the drive direction, and a drive coil. A gap between the surface of the driving magnet and an opposing drive coil is always kept a fixed distance over the whole of a drive stroke region as a result of a moveable part being guided by a guide shaft.

As shown in FIG. 15, at the magnet that is flat and has the same width in the drive direction, flux density flowing from the surface thereof is such that the direction of the flux density tends towards the drive direction side at the upper surfaces at both ends of the magnet and thrust generated at the coil is therefore also at an angle with respect to the drive direction. The thrust in the drive direction generated by the actuator therefore becomes lower towards both ends in the drive direction and becomes higher at a central section, as shown in FIG. 16.

The moving lens is constrained in the drive direction by a guide shaft and there is a certain angle between the drive direction and the thrust direction. Load due to friction between the guide shaft and the moving lens therefore increases due to a thrust component being generated in a direction rectilinear with the drive direction, and the drive load at both ends of the magnet increases.

Patent Document 1: Japanese Patent Laid-open Publication No. Heisei. 7-239437.

Patent Document 2: Japanese Patent Laid-open Publication No. 2002-169073.

When the moving lens is driven, the thrust in the drive direction generated by the drive coil changes according to the position of the moving lens. This damages the linearity of the thrust, and the drive load also changes according to position, and this is detrimental to the drive performance for the moving lens.

In particular, in the case of a servo system lens driving device configured using feedback control using a position detector etc., the stability of the servo system fluctuates according to the position of the moving lens because of the problem described above, with this being detrimental to the servo characteristics.

Further, it is not possible to effectively utilize the entire length of the magnet because the thrust generated by the coil at the ends of the stroke direction of the magnet falls. In cases where, for example, the thrust generated at the ends is not sufficient for that required by design for an actuator, it is necessary for only portions where the required thrust is obtained to be utilized, and the entire length of the magnet is therefore not used effectively. This makes it necessary to make the drive stroke small, and prevents the device from becoming smaller.

SUMMARY OF THE INVENTION

The present invention sets out to resolve these problems. The present invention is a lens driving device which comprises a driven body supporting an optical lens capable of freely moving along an optical axis direction, a drive coil fitted to the driven body, and a magnet having a surface set so as to have a prescribed gap with the moving drive coil, wherein a gap between the surface of the magnet and the drive coil is set in such a manner as to be broader at a central part of a range of movement of the drive coil than at an end part.

The present invention is a lens driving device which comprises a driven body supporting an optical lens capable of freely moving along an optical axis direction, a drive coil fitted to the driven body, and a magnet having a surface set so as to have a prescribed gap with the moving drive coil, wherein a width of the surface of this magnet is set in such a manner as to be narrower at a central part of a range of movement of the drive coil than at an end part.

In the present invention, the gap between the magnet surface and the drive coil is made to be broader at a central part of the range of movement of the drive coil than at the ends, and the width of the surface of the magnet is made narrower at the central part of the range of movement of the drive coils than at the ends. The magnetic field formed by the magnet is therefore uniform so that, for example, in the case of driving using a fixed voltage, drive thrust generated by the coil can be made fixed over the whole region of the moving stroke of the body being moved.

As described above, according to the present invention, the following effects are obtained. Linearity of the thrust generated by the actuator due to the unusual shape of the drive magnet is ensured, fluctuation in thrust when driving the focus lens and the zoom lens is suppressed, and it is possible to obtain good drive characteristics and servo characteristics. Drive load of the actuator due to the unusual shape of the drive magnet is fixed, and superior drive characteristics and servo characteristics can be obtained when driving the focus lens and the zoom lens. Further, the entire length of the magnets used with the lens driving device can be utilized, and inefficient use of space in the imaging device can be kept to a minimum. This makes it possible to make the lens barrel small due to it being possible to make the drive stroke large.

DESCRIPTION OF THE PREFERRED EMBODIMENTS

The following is a description based on the drawings of the embodiments of the present invention. First, a description of a fist embodiment is given. The lens driving device of this embodiment is applied to lens driving of a focus lens and a zoom lens in a lens barrel used in an imaging device such as a video camera.

Figure 1:
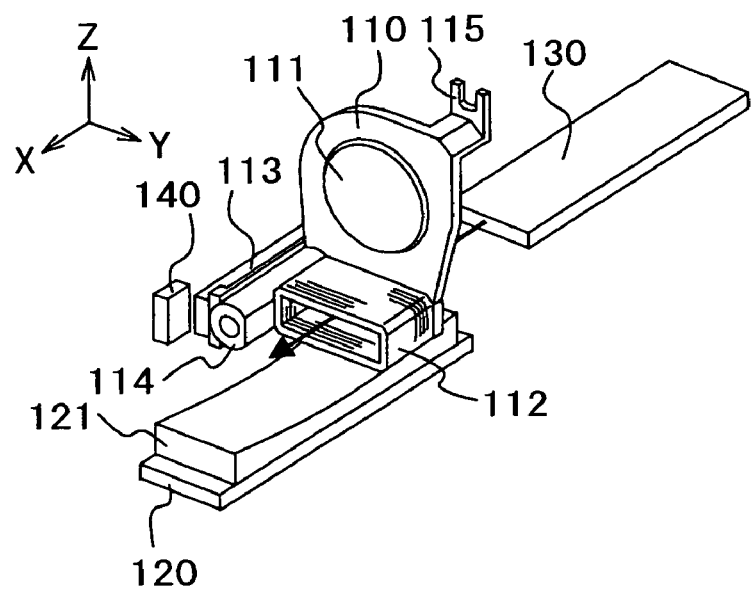
FIG. 1 is an exploded perspective view illustrating a first embodiment of the present invention.
Figure 2:
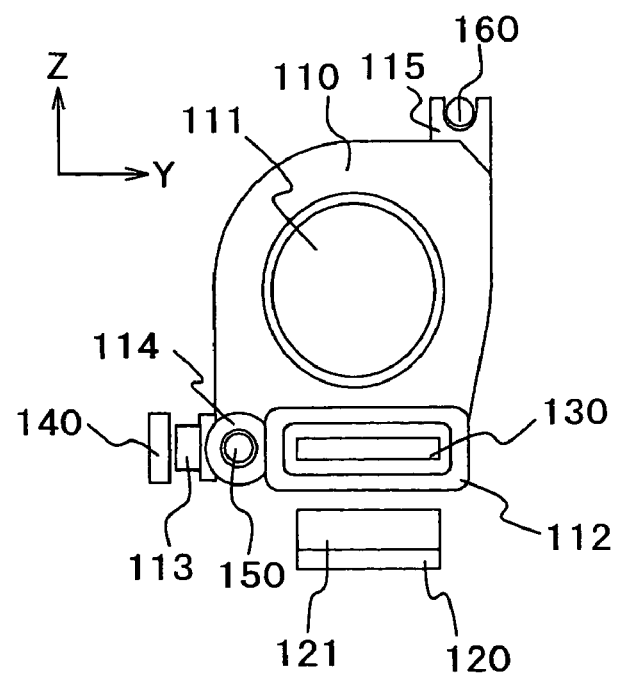
FIG. 2 is a front view illustrating the first embodiment.

FIG. 1 is an exploded perspective view of a lens driving device of this embodiment according to the present invention, and FIG. 2 is a front view of the lens driving device of this embodiment. Namely, a driven body 110 has an optical lens 111, a sleeve 114 on one side, and a slot 115 on the opposite side so as to sandwich the optical axis together with the sleeve 114.

Further, a guide shaft 150 is a shaft fitting into the sleeve 114 with no rattle in order to cause the driven body 110 to move along the direction of the optical axis. The guide shaft 160 is a shaft inserted as a brace at the slot 115 and is for preventing the driven body 110 from rotating the guide shaft 150 as center.

The driven body 110 is guided in the direction of movement without rattling by the guide shaft 150 inserted into the sleeve 114, and rotation of the driven body 110 is prevented by the guide shaft 160 inserted into the slot 115 so as to decide the optical axis. Further, the drive coil 112 is fixed to the driven body 110 using adhesive etc.

The magnet 121 is for causing the driven body 110 to move in the direction of the optical axis, and the shape of the magnet 121 is such that the surface (top surface) on the side of the drive coil 112 is curved in such a manner that the magnet is thinner towards a central part in the drive direction and thicker towards the ends. As a result, a gap between the surface of the magnet 121 and the opposing drive coil 112 is configured so as to be broad at the central part in the drive direction and narrower at the ends in the drive direction.

Further, an earthing yoke 120 is connected to earth at the opposite surface to the drive coil 112 with respect to the magnet 121, and an opposing yoke 130 is passed through the toroidally wound drive coil 112.

The position of the driven body 110 is detected by a position detection magnet 113 fitted to the driven body 110 and a magnetoresistive element 140 arranged in a non-contact manner spaced from the magnet. The position detection magnet 113 is a magnet where magnetic poles alternately change along the direction of movement, while on the other hand, the magnetoresistive element 140 is an element for which a resistance changes with changes in the magnetic field. Therefore, when the position detection magnet 113 moves in accompaniment with movement of the driven body 110, the magnetic field reaching the magnetoresistive element 140 arranged opposite changes, and the resistance of the magnetoresistive element 140 changes. It is then possible to accurately detect the position of the driven body 110 by observing changes in this resistance value. In the above, the magnetoresistive element 140 and the position detection magnet 113 are used as means for detecting the position of the driven body 110, but existing non-contact position detecting means may also be employed.

With the above configuration, when current flows in the drive coil 112, thrust parallel with the optical axis direction is generated (Fleming's left hand rule) at the drive coil 112 due to magnetic flux passing between the opposing yoke 130 and the drive magnet 121, and the driven body 110 is moved integrally together with the drive coil 112 in the optical axis direction as a result of this thrust.

Figure 3:
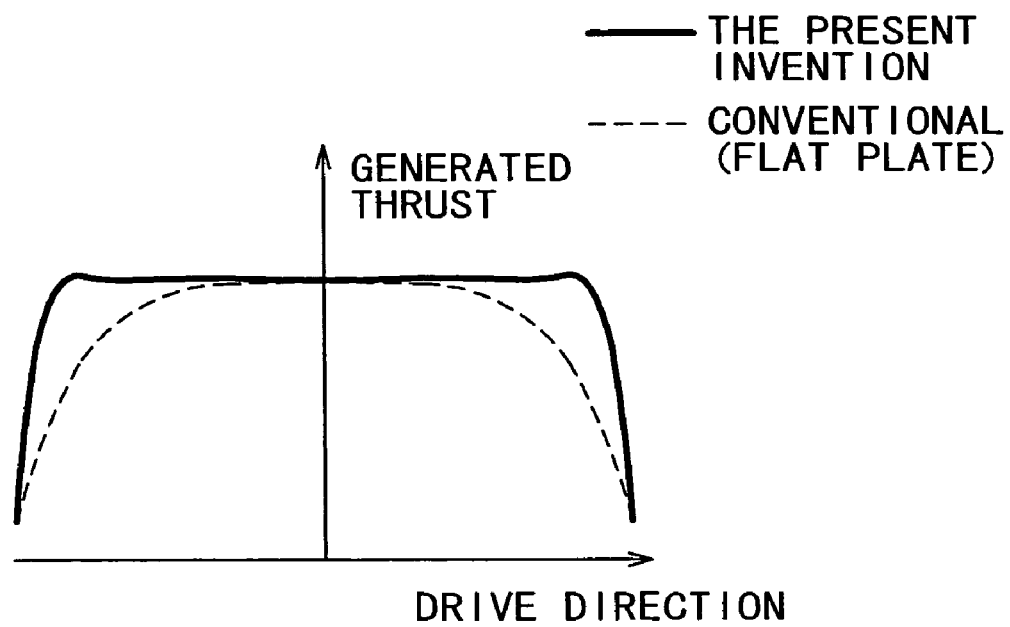
FIG. 3 is a view illustrating linearity of thrust generated with respect to the drive direction.

On the other hand, at the lens driving device of the above configuration, within a gap formed between the magnet 121 and the opposing yoke 130, a rectilinear component in the drive direction of magnetic flux density received by the drive coil is substantially the same at both the center and the ends of the magnet. As a result, a parallel and fixed thrust is generated in the drive direction over the entire drive stroke region at the drive coil 112, and linearity of thrust can be ensured as shown by the solid lines in FIG. 3.

Further, frictional resistance generated between the driven body 110 and the guide shafts becomes fixed because the thrust direction and the drive direction are always parallel over the entire region of the drive stroke. The thrust and drive load generated at the time of driving for focusing and zooming of the driven body 110 can therefore be kept fixed, and drive characteristics and servo characteristics can be made superior.

Next, a description is given of a second embodiment. The lens driving device of this embodiment is applied to lens driving of a focus lens and a zoom lens in a lens barrel used in an imaging device such as a video camera.

Figure 4:
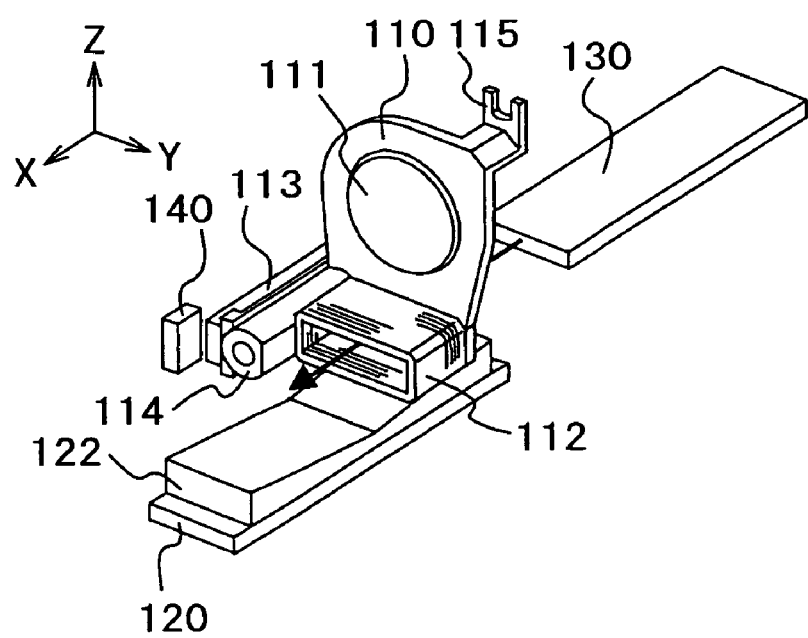
FIG. 4 is an exploded perspective view illustrating a second embodiment.

FIG. 4 is an exploded perspective view of a lens driving device of this embodiment. In this embodiment, portions that are the same as portions in FIG. 1 and FIG. 2 are given the same numerals, and detailed description thereof is omitted.

In FIG. 4, the lens driving device of this embodiment is such that the surface (top surface) of the magnet 122 is bent (inclined) on the side of the drive coil 112 in such a manner as to be thinner at a central part in the drive direction of the magnet 122 and thinner at the end parts. As a result, a gap between the surface of the magnet 122 and the opposing drive coil 112 is configured so as to be broad at the central part in the drive direction and narrower at the ends in the drive direction.

In this configuration also, as with the lens driving device of the first embodiment described above, the thrust and driving load occurring when driving for focusing and zooming can be kept fixed, and superior drive and servo characteristics can be attained.

Further, the lens driving device of the present invention is by no means limited to the first and second embodiments described above. For example, the shapes of the magnets 121 and 122 are by no means limited to that shown in the drawings, and various shapes obtaining the same results as for each of the embodiments described above may be considered. Further, the front and back surfaces of the magnets 121 and 122 may be curved or bent. Moreover, the magnets 121 and 122 are taken to have uniform thickness but the same results may also be obtained if the magnets 121 and 122 are curved or bent.

Next, a description is given of a third embodiment. The lens driving device of this embodiment is applied to lens driving of a focus lens and a zoom lens in a lens barrel used in an imaging device such as a video camera.

Figure 5:
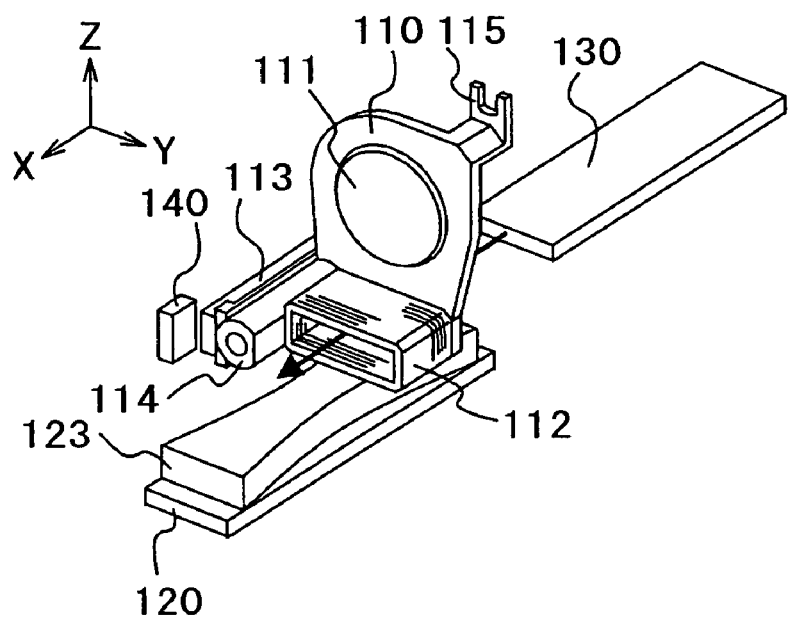
FIG. 5 is an exploded perspective view illustrating a third embodiment.

FIG. 5 is an exploded perspective view of a lens driving device of this embodiment. In this embodiment, portions that are the same as portions in FIG. 1 and FIG. 2 are given the same numerals, and detailed description thereof is omitted.

In FIG. 5, the lens driving device of this embodiment is such that the magnet 123 is bent in such a manner as to have a narrower width at a central part in the drive direction and broader width at the end parts. In this configuration also, as with the lens driving device of the first embodiment described above, the thrust and driving load occurring when driving for focusing and zooming can be kept fixed, and superior drive and servo characteristics can be obtained.

Next, a description is given of a fourth embodiment. The lens driving device of this embodiment is applied to lens driving of a focus lens and a zoom lens in a lens barrel used in an imaging device such as a video camera.

Figure 6:
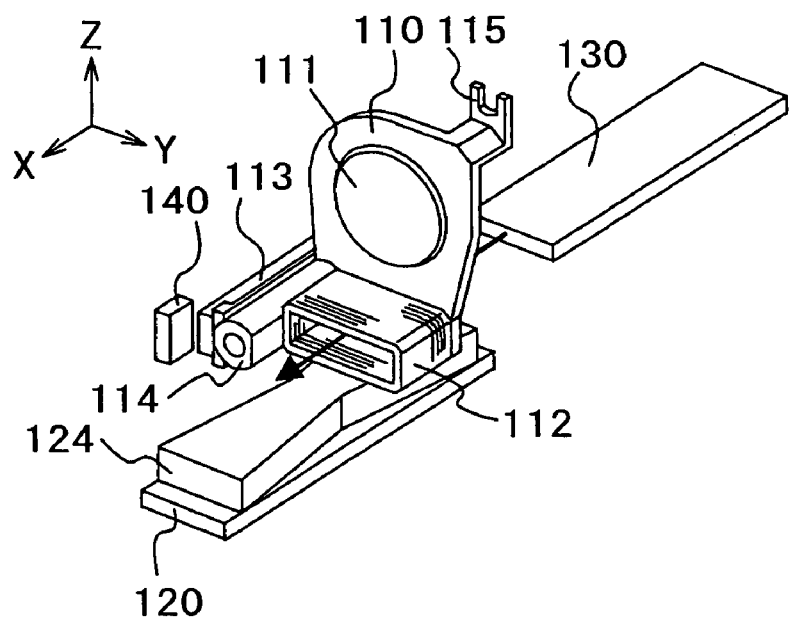
FIG. 6 is an exploded perspective view illustrating a fourth embodiment.

FIG. 6 is an exploded perspective view of a lens driving device of this embodiment. In this embodiment, portions that are the same as portions in FIG. 1 and FIG. 2 are given the same numerals, and detailed description thereof is omitted.

In FIG. 6, the lens driving device of this embodiment is such that the magnet 124 is bent in such a manner as to have a narrower width at a central part in the drive direction and broader width at the end parts. In this configuration also, as with the lens driving device of the first embodiment described above, the thrust and driving load occurring when driving for focusing and zooming can be kept fixed, and superior drive and servo characteristics can be obtained.

In the third and fourth embodiments described above, the thickness of the magnets 123 and 124 is fixed, and this is advantageous in the manufacture of magnets 123 and 124 employing molds. Further, the lens device of the present invention is by no means limited to the third and fourth embodiments described above. For example, the shapes of the magnets 123 and 124 are by no means limited to that shown in the drawings, and various shapes obtaining the same results as for each of the embodiments described above may be considered.

The following is a description of a fifth embodiment. The lens driving device of this embodiment is applied to lens driving of a focus lens and a zoom lens in a lens barrel used in an imaging device such as a video camera.

Figure 7:
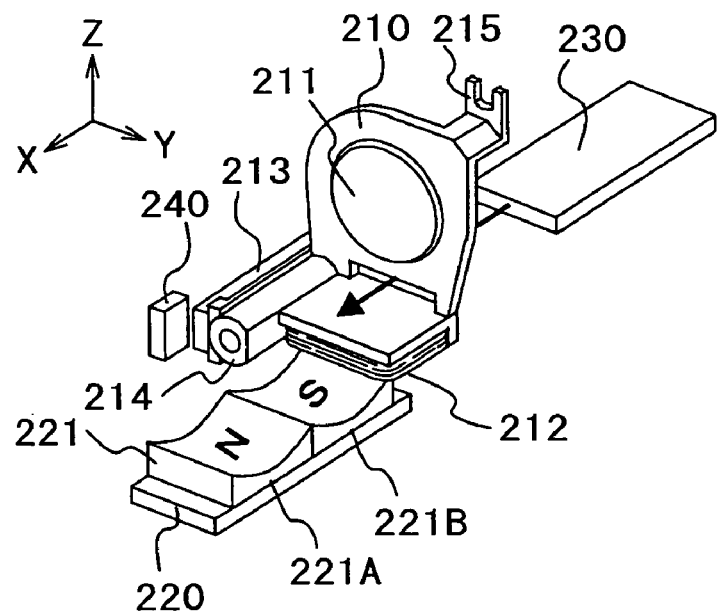
FIG. 7 is an exploded perspective view illustrating a fifth embodiment.
Figure 8:
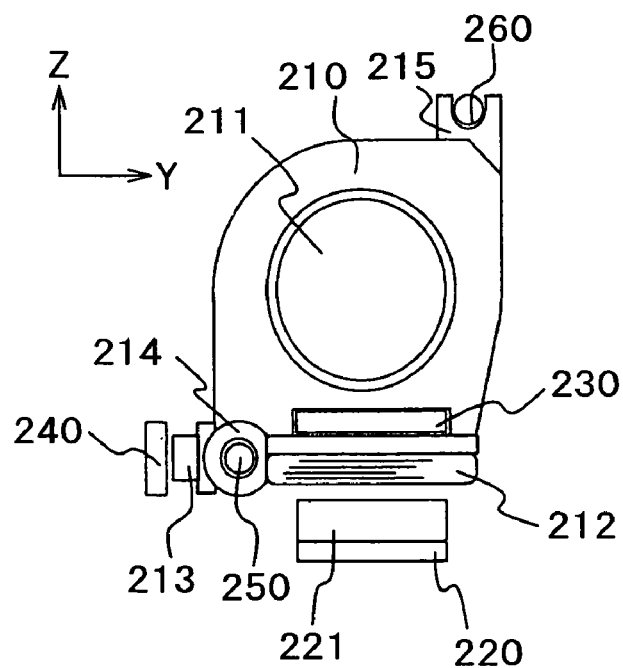
FIG. 8 is a front view illustrating the fifth embodiment.

FIG. 7 is an exploded perspective view of a lens driving device of this embodiment, and FIG. 8 is a front view of the lens driving device of this embodiment. Namely, a driven body 210 has an optical lens 211, a sleeve 214 on one side, and a slot 215 on the opposite side so as to sandwich the light axis together with the sleeve 214.

Further, a guide shaft 250 is a shaft fitting into the sleeve 214 with no rattle in order to cause the driven body 210 to move along the direction of the optical axis. The guide shaft 260 is a shaft inserted as a brace at the slot 215 and is for preventing the driven body 210 from rotating taking the guide shaft 250 as center.

The driven body 210 is guided in the direction of movement without rattling by the guide shaft 250 inserted into the sleeve 214 and rotation of the driven body 210 is prevented by the guide shaft 260 inserted into the slot 215 so as to decide the optical axis.

A flat coil 212 is wound in a flat manner and arranged in such a manner that a normal direction of the flat plane is at right angles with the drive direction. The flat coil 212 is fixed using adhesive etc. to the driven body 210.

The magnet 221 is such that a region 221A and a region 221B magnetized in mutually opposite directions are arranged next to each other along the direction of movement of the driven body 210. The shapes of the regions 221A and 221B are such that the surfaces (top surfaces) are curved so that the regions 221A and 221B are thin at central parts in the direction of movement and thick at the ends. As a result, a gap between the magnet 221 and the opposing drive coil 212 is configured so as to be broad at the central part in the drive direction and narrow at the ends in the drive direction.

Further, an earthing yoke 220 is connected to earth at a surface on the opposite side to the flat coil 212 with respect to the magnet 221, and an opposing yoke 230 is arranged so as to sandwich the flat coil 212 in parallel with the earthing yoke 220.

The position of the driven body 210 is detected by a position detection magnet 213 fitted to the driven body 110 and a magnetoresistive element 240 arranged in a non-contact manner spaced from the magnet. The position detection magnet 213 is magnet where magnetic poles alternately change along the direction of movement, while on the other hand, the magnetoresistive element 240 is an element for which a resistance changes with changes in the magnetic field. Therefore, when the position detection magnet 213 moves in accompaniment with movement of the driven body 210, the magnetic field reaching the magnetoresistive element 240 arranged opposite changes, and the resistance of the magnetoresistive element 240 changes. It is then possible to accurately detect the position of the driven body 210 by observing changes in resistance. In the above, the magnetoresistive element 240 and the position detection magnet 213 are used as means for detection the position of the driven body 210, but existing non-contact position detecting means may also be employed.

With the above configuration, when current flows in the drive coil 212, thrust parallel with the optical axis direction is generated (Fleming's left hand rule) at the drive coil 212 due to magnetic flux passing between the facing yoke 230 and the drive magnet 221, and the driven body 210 is moved integrally together with the drive coil 212 in the optical axis direction as a result of this thrust.

Figure 9:
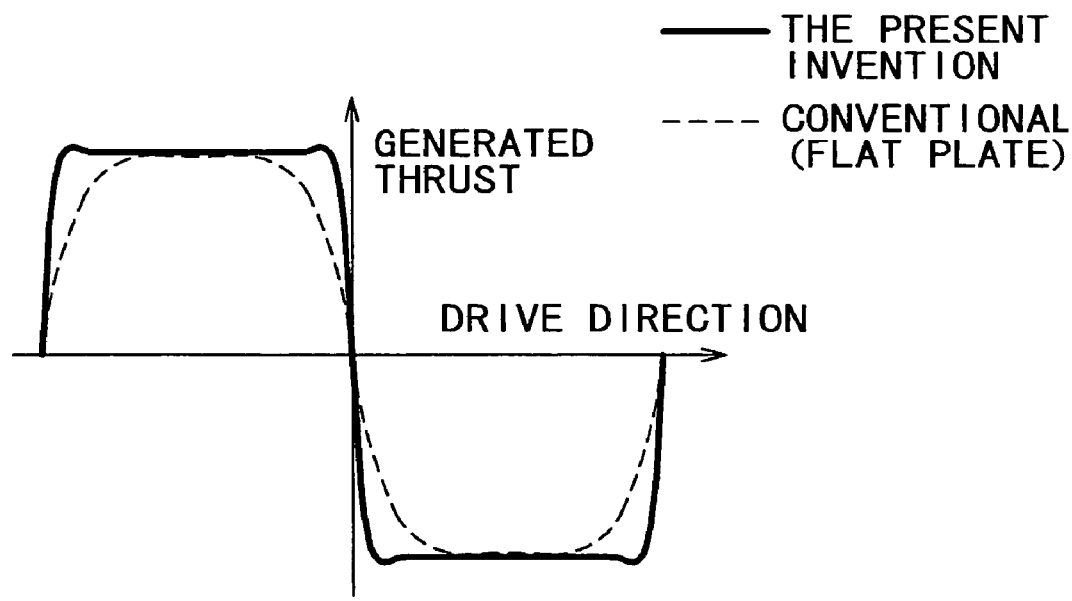
FIG. 9 is a view illustrating linearity of thrust generated with respect to the drive direction.

On the other hand, at the lens driving device of the above configuration, within a gap formed between the magnet 221 and the facing yoke 230, a rectilinear component in the drive direction of magnetic flux density acting on the drive coil is substantially the same at both the center and the ends of the magnet. As a result, a parallel and fixed thrust is generated in the drive direction over the entire drive stroke region at the drive coil 212, and linearity of thrust can be ensured as shown by the solid lines in FIG. 9.

Further, frictional resistance generated between the driven body 210 and the guide shafts becomes fixed because the thrust direction and the drive direction are always parallel over the entire region of the drive stroke. The thrust and drive load generated at the time of driving for focusing and zooming of the driven body 210 can therefore be kept fixed, and drive characteristics and servo characteristics can be made superior.

Next, a description is given of a sixth embodiment. The lens driving device of this embodiment is applied to lens driving of a focus lens and a zoom lens in a lens barrel used in an imaging device such as a video camera.

Figure 10:
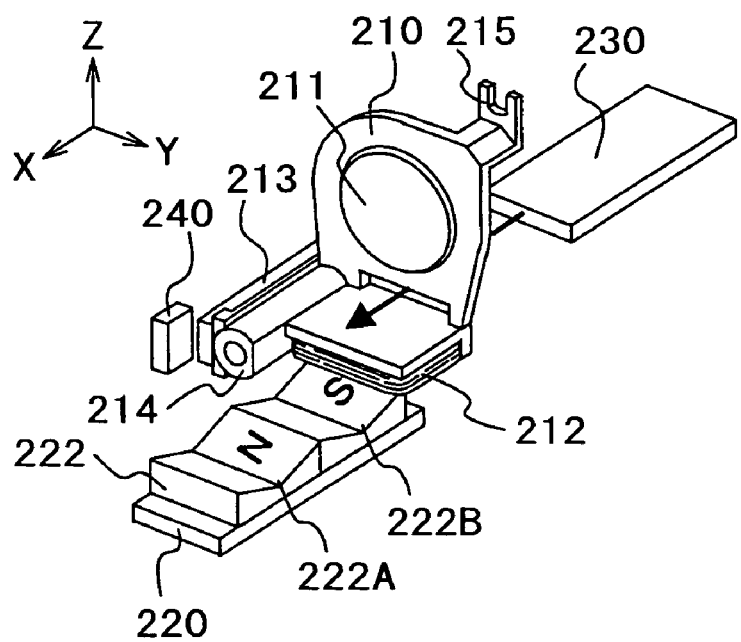
FIG. 10 is an exploded perspective view illustrating a sixth embodiment.

FIG. 10 is an exploded perspective view of a lens driving device of this embodiment. In this embodiment, portions that are the same as portions in FIG. 7 and FIG. 8 are given the same numerals, and detailed description thereof is omitted.

In FIG. 10, the lens driving device of this embodiment is such that the surfaces on the sides of the drive coil 212 are bent in such a manner as to be thinner at centrals part in the drive direction of the magnet 122 and thinner at the end parts.

In this configuration also, as with the lens driving device of the fifth embodiment described above, the thrust and driving load occurring when driving for focusing and zooming can be kept fixed, and superior drive and servo characteristics can be attained.

Further, the lens device of the present invention is by no means limited to that of the fifth and sixth embodiments. For example, the shapes of the magnets 221 and 222 are by no means limited to that shown in the drawings, and various shapes obtaining the same results as for each of the embodiments described above may be considered. The front and back surfaces of the magnets 221 and 222 may be curved or bent. Moreover, the magnets 221 and 222 are taken to have uniform thickness but the same results may also be obtained if the magnets 221 and 222 are curved or bent.

Next, a description is given of a seventh embodiment. The lens driving device of this embodiment is applied to lens driving of a focus lens and a zoom lens in a lens barrel used in an imaging device such as a video camera.

Figure 11:
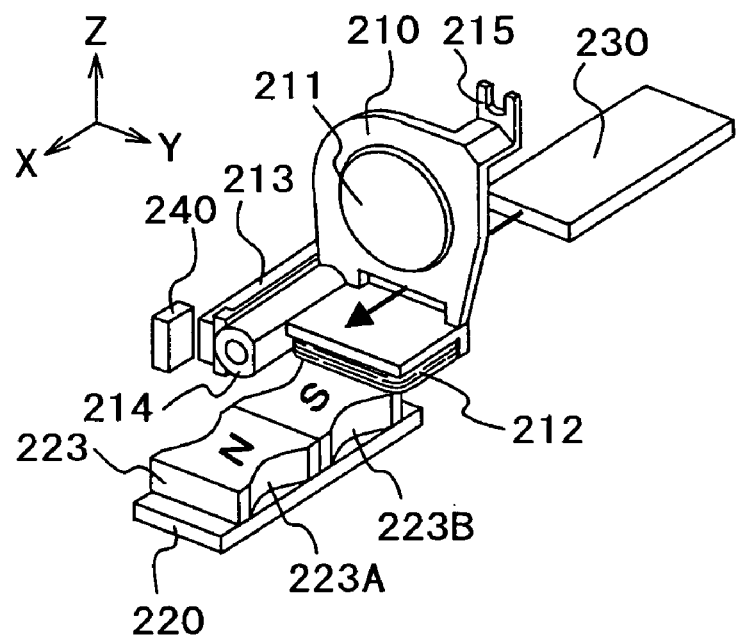
FIG. 11 is an exploded perspective view illustrating a seventh embodiment.

FIG. 11 is an exploded perspective view of a lens driving device of this embodiment. In this embodiment, portions that are the same as portions in FIG. 7 and FIG. 8 are given the same numerals, and detailed description thereof is omitted.

In FIG. 11, the lens driving device of this embodiment is such that respective regions of the magnets 223A and 223B are bent in such a manner as to have a narrower widths at a central part in the drive direction and broader widths at the end parts. In this configuration also, as with the lens driving device of the fifth embodiment described above, the thrust and driving load occurring when driving for focusing and zooming can be kept fixed, and superior drive and servo characteristics can be attained.

Next, a description is given of an eighth embodiment. The lens driving device of this embodiment is applied to lens driving of a focus lens and a zoom lens in a lens barrel used in an imaging device such as a video camera.

Figure 12:
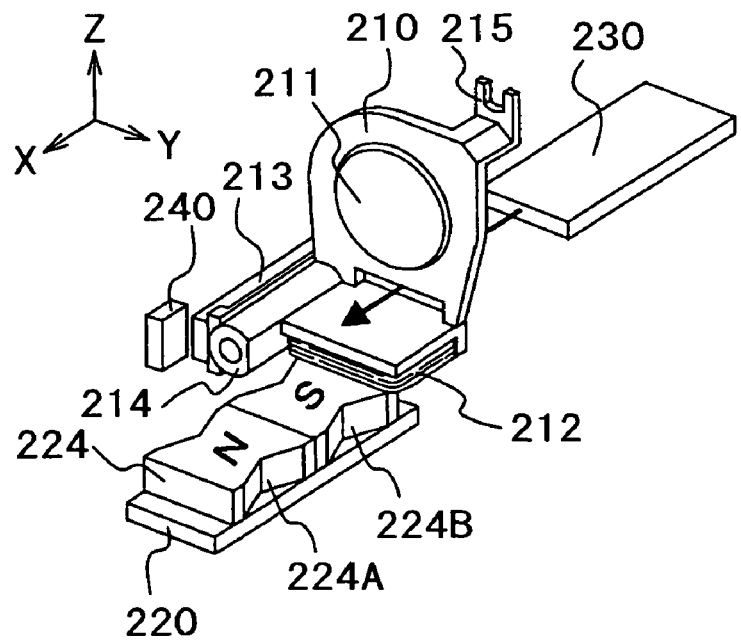
FIG. 12 is an exploded perspective view illustrating an eighth embodiment.

FIG. 12 is an exploded perspective view of a lens driving device of this embodiment. In this embodiment, portions that are the same as portions in FIG. 7 and FIG. 8 are given the same numerals, and detailed description thereof is omitted.

In FIG. 12, the lens driving device of this embodiment is such that respective regions of the magnets 224A and 224B are bent in such a manner as to have narrower widths at central parts in the drive direction and broader widths at the end parts. In this configuration also, as with the lens driving device of the fifth embodiment described above, the thrust and driving load occurring when driving for focusing and zooming can be kept fixed, and superior drive and servo characteristics can be attained.

In the seventh and eighth embodiments described above, the thickness of the magnets 223 and 224 is fixed, and this is advantageous in the manufacture of magnets 223 and 224 employing molds. Further, the lens device of the present invention is by no means limited to the seventh and eighth embodiments described above. For example, the shapes of the magnets 223 and 224 are by no means limited to that shown in the drawings, and various shapes obtaining the same results as for each of the embodiments described above may be considered.

Next, a description is given of the bent or curved parts of the magnets in each embodiment. In this embodiment, by providing bent or curved parts at both ends of the magnets as described above, the rectilinear component of the magnetic flux density in the drive direction incurred by the drive coil is substantially the same at the center of the magnets and the ends of the magnets and a fixed thrust is therefore generated parallel to the drive direction over the entire drive stroke region of the drive coil.

When this kind of magnet is constructed, the size of the bent parts or curved parts provided at the ends of the magnet is obtained by examining changes in the drive coil occurring in the length (length along the direction of movement of the drive coil) direction of the magnet.

Figure 13:
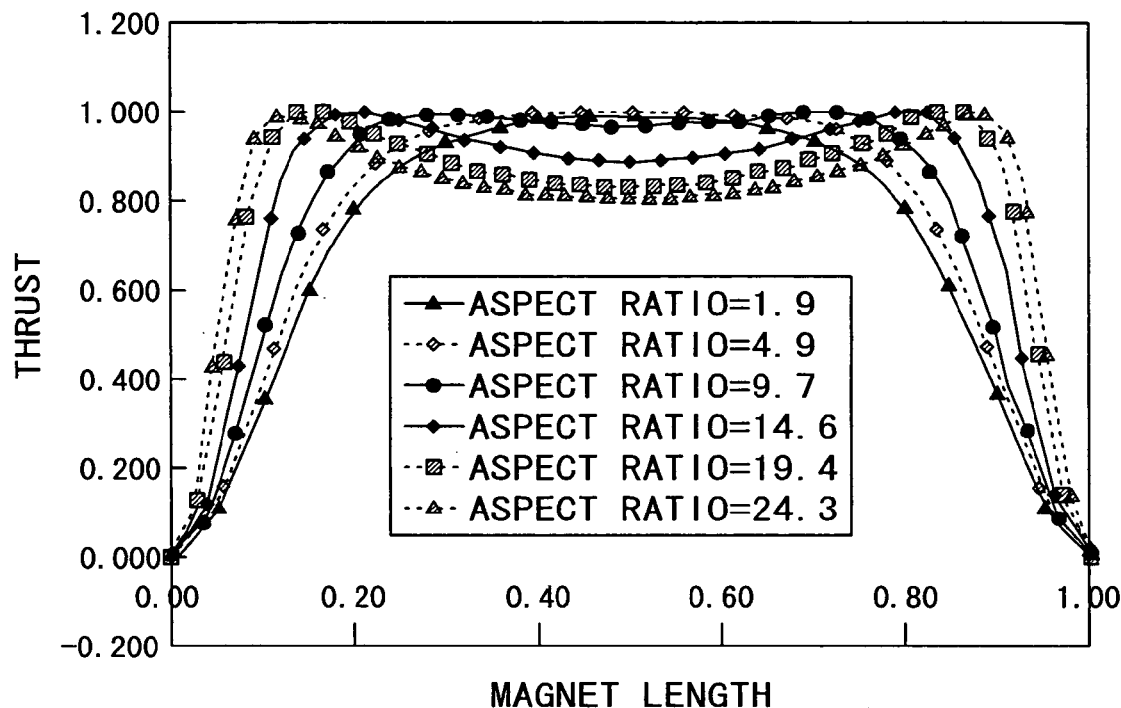
FIG. 13 is a view illustrating change in thrust in the lengthwise direction of a magnet.

FIG. 13 is a view showing a situation where change in thrust along the length direction of a magnet is calculated taking the aspect ratio (length/thickness) as a parameter. Further, FIG. 14 is a view showing aspect ratio of a magnet and proportion of decrease in drive coil thrust.

From the relationship of FIG. 13, it can be understood that the proportion of a decrease in thrust part of the drive coil corresponding to the parts at both end of the magnet is smaller for a large aspect ratio for the magnet, and that the proportion of a decrease in thrust part of the drive coil corresponding to parts at both ends of the magnet is larger for a large aspect ratio.

Figure 14:
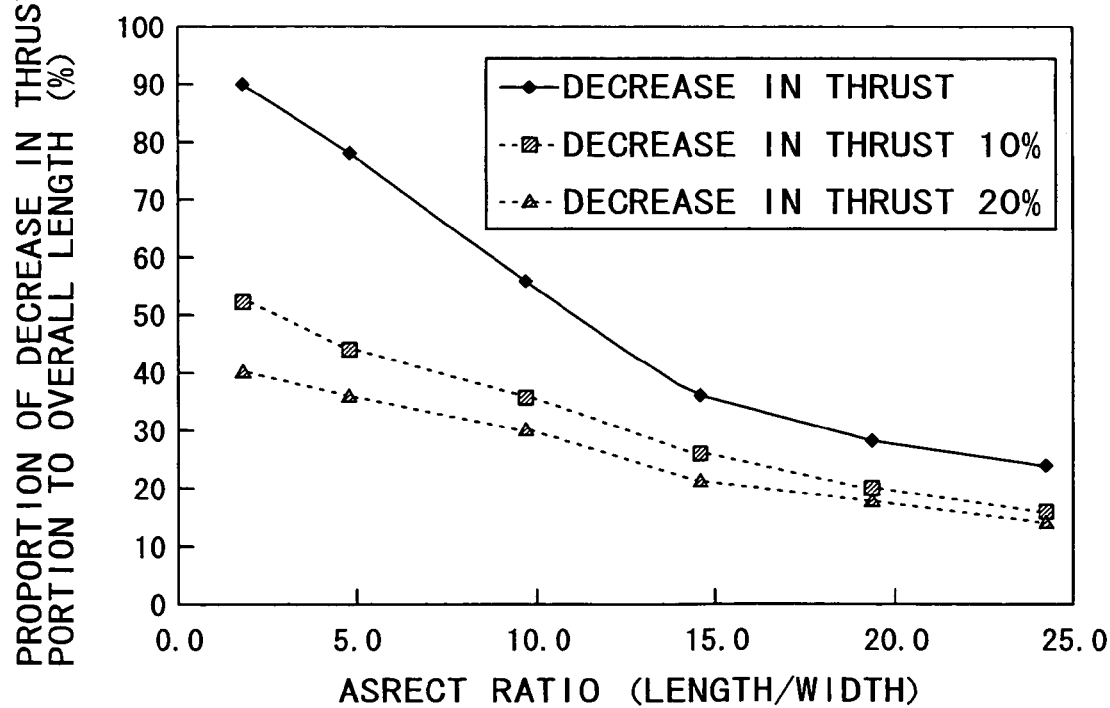
FIG. 14 is a view showing aspect ratio of a magnet and proportion of decrease in drive coil thrust.
Figure 15:
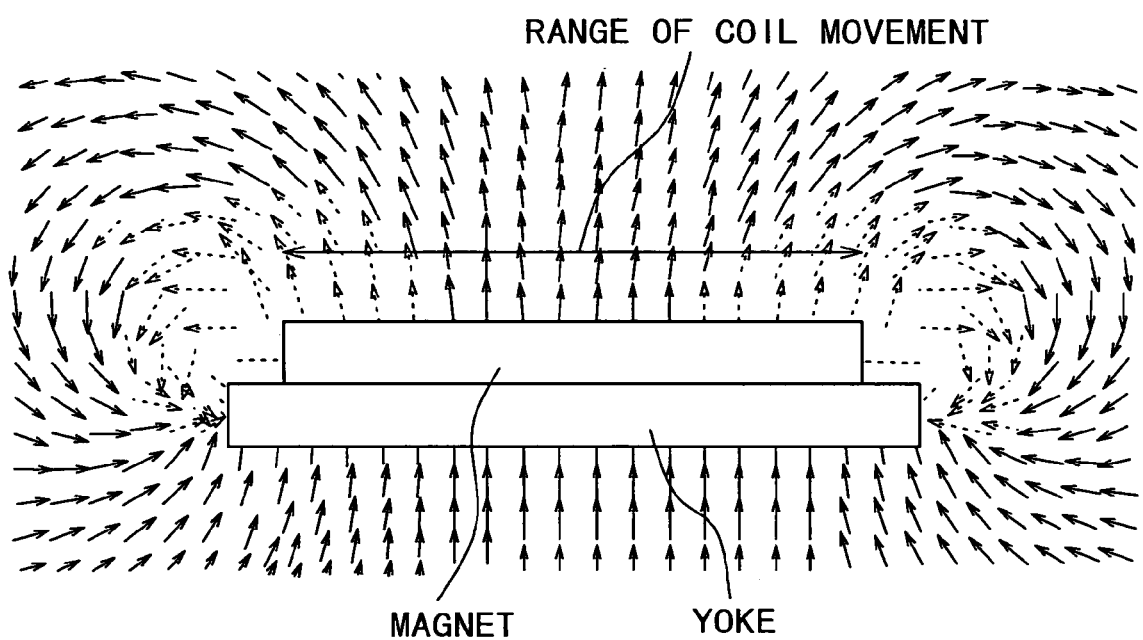
FIG. 15 is a view illustrating magnetic flux density flowing from a surface of a magnet.
Figure 16:
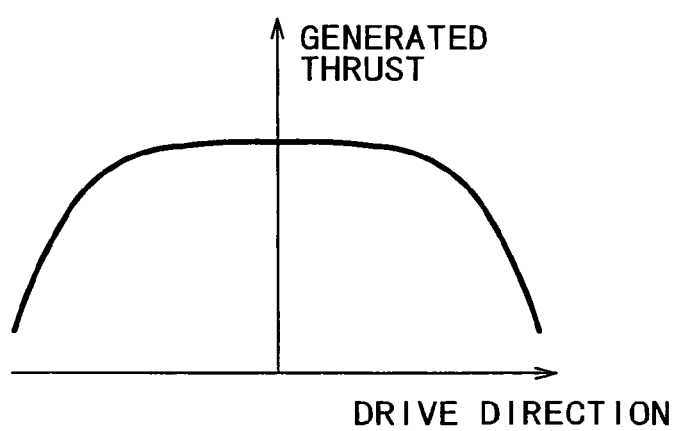
FIG. 16 is a view illustrating thrust generated with respect to the drive direction.

Further, from the relationship shown in FIG. 13, FIG. 14 shows the proportion with respect to overall magnet length for portions of 100% (no fall in thrust), 90% (10% fall in thrust), and 80% (20% fall in thrust) of the maximum thrust. According to FIG. 14, if the range (proportion of overall length) of bent portions or curved portions at both ends of the magnet is decided, the thrust of the drive coils can be made uniform with respect to the overall length of the magnet.

What is claimed is:

1. A lens driving device comprising:
   a driven body supporting an optical lens capable of moving along an optical axis direction;
   a drive coil fitted to said driven body; and
   a magnet having a surface set so as to have a prescribed gap with said drive coil, wherein
   a width of the surface of said magnet is set in such a manner as to be narrower at a central part of a range of movement of said drive coil than at an end part.

2. The lens driving device as cited in claim 1, wherein said width is set by a curve of the surface of said magnet.

3. The lens driving device as cited in claim 1, wherein said width is set by a bend of the surface of said magnet.

4. A lens driving device comprising:
   a driven body supporting an optical lens capable of moving along an optical axis direction;
   a drive coil fitted to said driven body and wound in a direction parallel to the moving direction of said driven body; and
   a magnet having a plurality of regions magnetized in mutually opposite directions being arranged next to each other along the direction of movement of said driven body and a surface set so as to have a prescribed gap between it and said drive coil and the surface of the regions, wherein
   said gap between the surface of said magnet and said drive coil at each of the regions of said magnet is set in such a manner as to be broader at a central part of a range of movement of said drive coil than at an end part at each of the regions of said magnet.

5. The lens driving device as cited in claim 4, wherein said width is set by a curve of the surface of said magnet.

6. The lens driving device as cited in claim 4, wherein said width is set by a bend of the surface of said magnet.

7. A lens driving device comprising:
   a driven body supporting an optical lens capable of moving along an optical axis direction;
   a drive coil fitted to said driven body and wound in a direction parallel to the moving direction of said driven body; and
   a magnet having a plurality of regions magnetized in mutually opposite directions being arranged next to each other along the direction of movement of said driven body and a surface set so as to have a prescribed gap between it and said drive coil and the surface of the regions, wherein
   said gap between the surface of said magnet and said drive coil at each of the regions of said magnet is set in such a manner as to be broader at a central part of a range of movement of said drive coil than at an end part at each of the regions of said magnet.

8. The lens driving device as cited in claim 7, wherein said width is set by a curve of a side surface at each of the regions of said magnet.

9. The lens driving device as cited in claim 7, wherein said width is set by a bend of a side surface at each of regions of said magnet.

10. An imaging device comprising said lens driving device as cited in one of claims 1 to 9.

* * * * *